Jan. 23, 1951         E. V. MISULIS         2,538,878
RETRACTABLE LANDING GEAR
Filed Feb. 5, 1948                    2 Sheets-Sheet 1
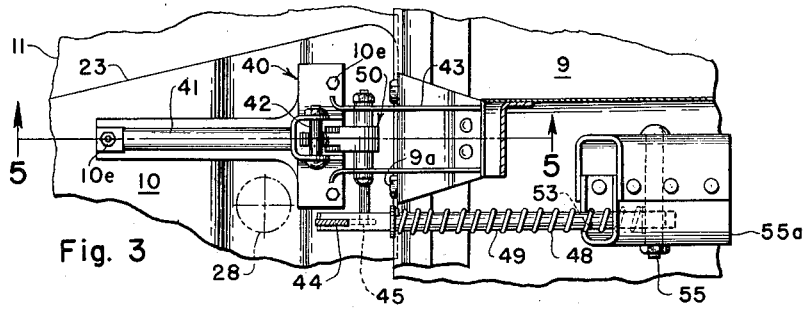
Fig. 3
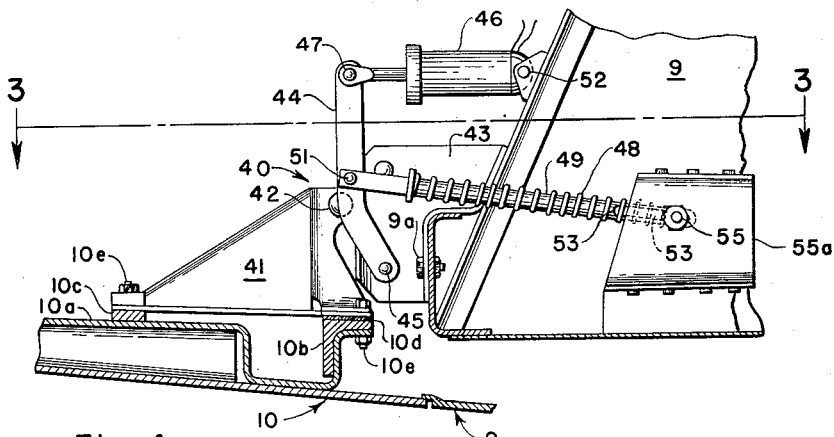
Fig. 4
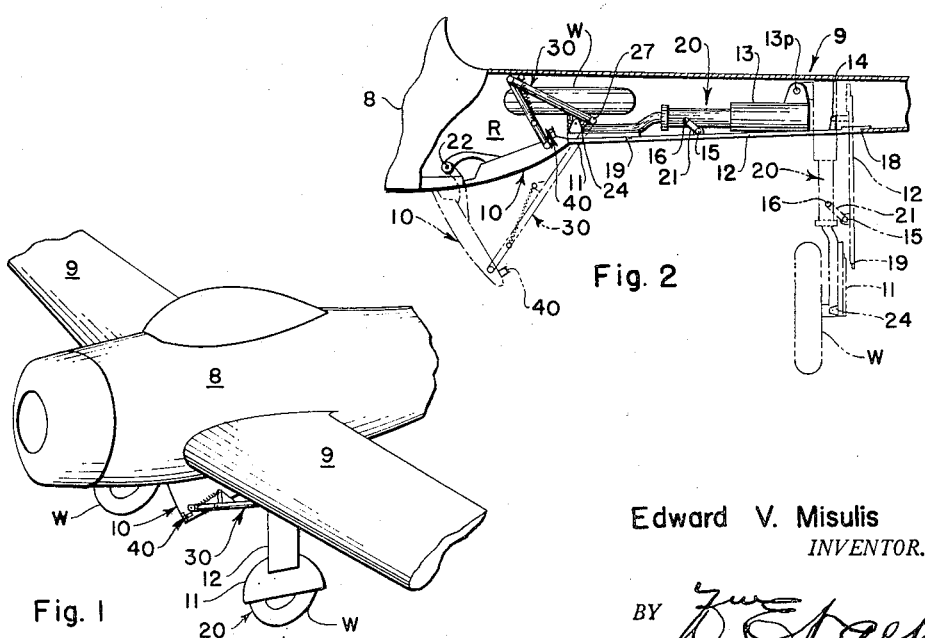
Fig. 2
Fig. 1
Edward V. Misulis
*INVENTOR.*
BY 
HIS PATENT ATTORNEY

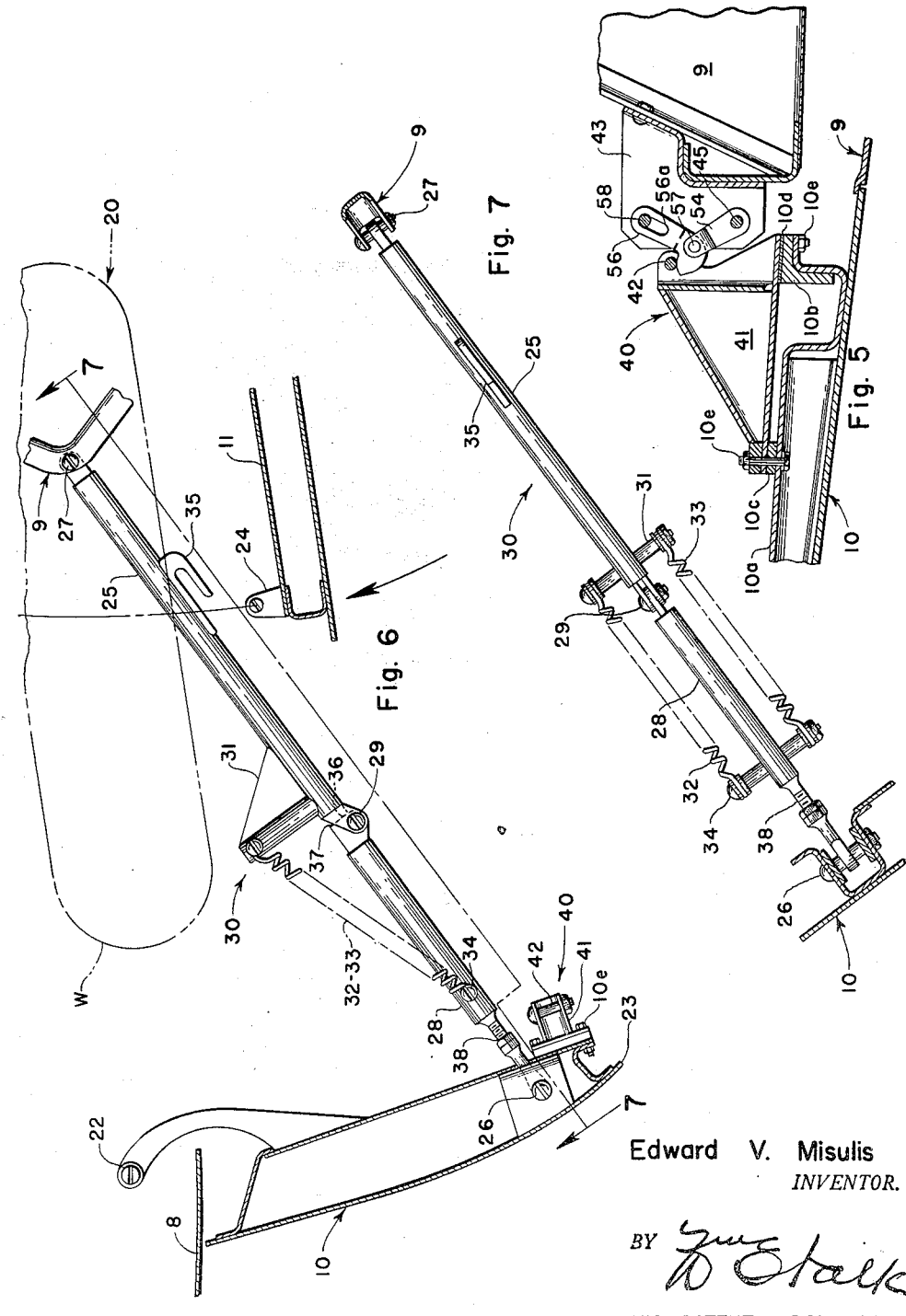

Patented Jan. 23, 1951

2,538,878

UNITED STATES PATENT OFFICE 2,538,878

RETRACTABLE LANDING GEAR

Edward V. Misulis, Buffalo, N. Y., assignor to Curtiss-Wright Corporation, a corporation of Delaware Application February 5, 1948, Serial No. 6,487

15 Claims. (Cl. 244—102)

The present invention relates generally to landing gears for aircraft and more particularly to improved fairings for retractable landing gears.

As a result of the greatly increased velocities required of modern aircraft, and more particularly combat or military airplanes, the necessity for fairing the retractable landing gear units has attained much greater importance and prominence in aircraft design. Because of the need for presenting a smooth surface when the landing gear is retracted, it has become increasingly important to utilize simple, strong and efficient links capable of withstanding the high airloads which tend to lift the door or fairing off the structure.

One of the most critical parts of the landing gear fairing is that portion which covers the lower, or wheel, portion or which covers the part of the gear which contacts the ground. This fairing portion is subject to the necessity that it must not extend beyond the wheel when extended but must preferably extend beyond the wheel when it is retracted. In a majority of aircraft landing gear arrangements the wheel is usually retracted laterally inboard from its extended position. At the present time, the more common methods of fairing the landing gear deal with the lower, or wheel, portion of the gear as follows: (1) Elimination of the portion of the fairing covering the lower gear portion; (2) Where a door is used, pivoting or collapsing this lower door on the upper portion of the fairing; (3) Using a one-piece fairing which is raised for suitable ground clearance; (4) Splitting the fairing, with the lower portion being pivoted upon the structure.

The latter, or fourth, type of fairing installation is quite commonly used because of the aerodynamic cleanness made possible by having a strong rigid door that will not readily deflect due to the airloads imposed at higher speeds. The actuation of such doors in the proper sequence has, however, presented several major problems. These problems are contributed to by the fact that the initial rate of door movement must be very great to prevent its interference with the wheel and tire on the pivoting main landing gear strut. Following this initial rapid movement the door must be held rigid in the open position until the gear is almost entirely retracted, and then the fairing door must be rapidly closed and held firmly closed against aerodynamic forces which are trying to open it. Efforts have been made to accomplish this actuation by means of links and mechanism from the main retracting linkage, but such prior linkage systems and the necessary actuating forces presented numerous difficulties which were not completely overcome. The use of a hydraulic or electric jack strut was also employed with a sequence mechanism to assure proper timing, but these units invariably developed trouble and caused the malfunctioning of many landing gears. Another approach involved the use of a roller or rubbing strip on an arm which actuated and locked the door, as a result of contact with the wheel, during retraction and extension. In such installations, however, linkage difficulties were also hard to overcome because of the small moment arms which were available, the impact and wear were serious due to contact with the rapidly rotating wheel, and flat or soft tires frequently allowed the fairing to open prematurely during flight. These installations also made the use of locking mechanisms necessary for both terminal positions and these mechanisms frequently involved complicated arrangements which were costly and subject to faulty operation.

It is accordingly a major object of the present invention to provide a simple, rugged fairing for an aircraft landing gear. It is another object to provide an inboard landing gear fairing portion which is operated automatically and mechanically from the retracting and extending movements of the landing gear. A still further object of this invention is the provision of a landing gear fairing mechanism for a lower, or wheel portion, which fairing mechanism is relatively simple in construction and can be selectively resiliently biased toward its open or closed position. It is still a further objective of the present invention to provide a landing gear fairing door which is actuated by the retracting motion of the landing gear itself and yet does not require a complicated actuating mechanism. It is a further object to provide a fairing door which has a high initial rate of movement to avoid interference with the landing gear and to provide an improved locking mechanism for its closed position.

Other objects and advantages of the present invention will become apparent to those skilled in the art after a reading of the following description taken together with the accompanying drawings, forming a part hereof, in which:

Figure 1 is a perspective view of an airplane having a retractable landing gear on which the present improved fairing means is shown applied;

Figure 2 is an enlarged front elevational view, partly broken away, of the fairing installation as applied to the airplane in Figure 1;

Figure 3 is an enlarged detailed plan view of the locking mechanism for the inboard fairing door shown in the preceding figures;

Figure 4 is an elevational view of the fairing door locking mechanism shown in Figure 3, as viewed looking outboard;

Figure 5 is a cross-sectional view of the door locking mechanism as taken along the lines 5—5 of Figure 3;

Figure 6 is an enlarged elevational view illustrating the actuating linkage for the fairing door as viewed looking rearwardly; and Figure 7 is a projected view of the actuating linkage shown in Figure 6.

Referring now to Figures 1 and 2, the numeral 8 indicates the fuselage portion of an airplane provided with laterally extending wings 9, and a laterally inwardly retractable landing gear 20 provided with fairing doors 10, 11 and 12. In these figures, the landing gear assembly is indicated by the numeral 20, being retracted by suitable mechanism laterally and inwardly into the recess or compartment R, with its wheel portion within the wing root portion adjacent the fuselage 8. In the same figures, the numeral 30 indicates the actuating linkage or folding strut assembly for the automatic actuation of the inboard fairing door 10.

As more particularly shown in Figure 2, it will be noted that the inboard fairing door 10 is pivotally mounted at its inboard edge on the fuselage structure 8 by means of a pivotal connection at 22. The landing gear assembly 20 may otherwise be of a conventional type, the cylinder portion of the main strut 13 being pivotally mounted upon the wing structure at 13p and is provided with suitable retracting mechanism and controls, as well as means for locking the gear in its terminal positions. The upper portion of the wheel fairing or inter-door 11 is rigidly attached to the wheel-carrying piston portion of the landing gear strut 13, adjacent the upper portion of the wheel W, and the upper strut fairing member 12 is pivotally attached to the link 21 by means of the pivot 15 and the link is in turn pivotally attached to the strut 13 by means of the pivotal connection 16. This latter pivotal connection is made to the strut member 13 through the link 21 adjacent the lower portion of the upper strut fairing 12, and its upper portion is pivotally connected to the wing structure at the pivot 14. It will accordingly be noted that the closure for the recess or opening R provided in the undersurface of the wing 9 and the adjacent portion of the fuselage 8 is comprised of an inboard fairing door member 10 pivotally carried upon the fuselage 8, the intermediate fairing member 11, and the upper strut fairing member 12, the latter two portions of which are carried essentially by the retractable landing gear assembly 20, except for the pivotation upon the wing at 14.

The upper strut fairing member 12 overlaps the fixed wheel fairing 11 at the lap joint 19 and is in turn recessed under the wing structure skin at 18 when it is retracted with the landing gear, such that a smooth and continuous wing undersurface is presented to the airstream. In Figure 2, the landing gear is shown fully retracted in the full line indication of the gear as well as the fairing door units, and in this figure there is also shown in phantom the relative position of the fairing units and their actuating linkages in the operative position of the landing gear.

For the inboard door construction and actuating details, reference is now made to Figure 6 which illustrates the inboard fairing door 10 in the extended position as rotated downwardly and outwardly about its inboard pivot 22 such that its outer edge 23 is moved sufficiently downwardly and inwardly to permit the extending wheel W to clear the same. As shown in this figure, the inboard door 10 and its actuating linkage assembly 30 is about to be engaged by the upwardly moving door actuator 24 on the fixed wheel fairing member 11, carried by the landing gear. As has been previously indicated, the inboard fairing door 10 is pivotally mounted on the fuselage structure at 22 and is braced in both its open and closed positions by the actuating link assembly 30 which is pivotally attached to the door 10 at the pivot 26 and at its outer end to the wing structure 9 at the pivot 27. The link assembly 30 consists of the outer member 25 and the inner member 28 intermediately pivoted at 29. The outer link member 25 has formed thereon the upwardly extending support 31 which serves as the outer anchorage or terminal for the pair of biasing springs or other resilient means 32 and 33, which are pivotally attached at their opposite terminals to the transverse pin 34 carried by the link member 28.

The outer link element 25 of the linkage assembly 30 also has fixedly carried thereby the hook fitting 35 adapted to be engaged by the door actuator 24; and the swinging end of the link member 25 is provided with the face stop 36 for engaging the face stop 37 on the adjacent end of the member 28. These face stops 36 and 37 serve to limit the rotation of the links 25 and 28 about their common intermediate pivot 29 under the influence of the biasing springs 32 and 33, which cause the links to be resiliently held in their aligned position, as shown in Figure 6, in which these face stops are in abutting contact. The inboard end of the link member 28 is provided with an adjustable terminal 38 by means of which the effective length of the link assembly 30 between the pivots 26 and 27 can be adjusted for the predetermined positioning of the door 10. As the wheel fairing door element 11 is carried by the landing gear assembly 20 in its retracting upward movement indicated by the arrow in Figure 6, the member 24 carried on the fairing unit 11 engages the hook fitting 35 causing the link assembly 30 to "break" upwardly about its intermediate pivot 29. This breaking of the linkage assembly 30 causes the upper link 25 to pivot clockwise from the wing pivot connection 27 and the lower link member 28 to pivot counterclockwise about the pivot connection 26 to the door 10, thereby causing the door 10 to be folded or rotated counterclockwise about its pivotal connection 22. When the axis of the resilient means 32 and 33 passes to the other side of the common intermediate pivot 29 of the links 25 and 28, the resilient means serves to bias and accelerate the folding of the links and the movement of the inboard fairing door 10 upwardly toward the closed position shown in the full lines in Figure 2.

Reference is now made to Figures 1 and 2 for the location of the inboard fairing door lock assembly 40, which is disposed at the outer edge 23 of the inboard door 10, being shown in detail in Figures 3, 4, and 5. The lock assembly 40 is supported from the bracket 41 which is attached to the door 10 and its backing framework 10a by means of the attachment bolts 10e. The attachment through the backing panel 10a includes an adjustment shim 10c, and the attachment at the flange edge of the framework 10a is made through an angle member 10b as well as a further shim 10d, these shims permitting accurate adjustment of the camming latch roller 42 carried by the bracket 41. This lock assembly 40 is composed of the locking roller 42 on the support bracket 41 mounted on the inboard door 10, as also shown in Figure 6, and the actuating mechanism is pivotally carried on the wing structure bracket 43, attached to the structure by the bolts 9a. An actuating bell-crank 44 is pivotally mounted on the bracket 43 at the pivot 45 and is actuated by an electric jackscrew 46 which pivotally attaches to it at the point 47 and is in turn pivotally mounted on the wing structure at the pivot point 52. A rod member 49 is pivotally attached to the bell-crank 44 at the pivot 51 and its opposite end 55 is slidable into the wing structure due to the slot 53 in the rod 49. The rod is provided with a co-axially disposed coil spring, or other resilient means 48, which resiliently opposes the jackscrew 46 to insure that the locking members are engaged at all times except when the jackscrew 46 moves the same to the inoperative position.

Referring now to Figures 3 and 5, it will be noted that the hook assembly 50 is pivotally supported in the structural bracket 43, carried by the wing structure 9. The member 54 of the hook assembly 50 forms the actuating arm for the hook assembly and is rigidly attached to the pivotal shaft member 45 to which the bell-crank 44 is also rigidly attached. The arm member 54 is pivotally attached to the hook member 56 at the pivot 57 and the hook member 56 is pivotal and slidable along the slot 56a and on the structure at the pivot point 58. It will accordingly be seen that as the door 10 is closed, the hook member 56 is cammed by the roller member 42 to the open position against the action of the resilient means 48, which after the door 10 has been fully closed, forces the hook member 56 into the locked position. When the landing gear is to be again extended, actuation of the jackscrew 46 trips the hook 56 prior to operation of the landing gear up-lock thus assuring proper sequence of operation.

As the extension of the landing gear assembly 20 and its attached intermediate fairing door 11 is initiated about the landing gear pivot 13p, the detent roller 24 pulls the hook member 35 of the breaking strut assembly 30 downwardly causing the inboard door to open ahead of the wheel W. As the breaking strut assembly is straightened or aligned, the biasing springs 32—33, as they pass the dead-center of their common pivot 29, assert their influence and align the struts 25 and 28 into the position shown in Figure 6. This has the effect of imparting a high initial rate of movement of the door 10 such that an opening with ample clearance is provided for the extending wheel W; and it simultaneously serves to accelerate the movement of the hook member 35 such that it is disengaged from the detent member 24, thus freeing the landing gear assembly and its associated fairing doors from the actuating mechanism for the inner door 10.

As the extension of the landing gear assembly is continued, the inner door assembly 10 is maintained in its fully opened position by the actuating strut assembly 30 and the fairing doors 11 and 12 are separated due to the landing gear pivotation. As indicated above, the intermediate fairing door 11 is fixedly attached to the wheel-carrying or piston element of the landing gear, and the outer or upper strut fairing door 12 is pivotally mounted to the wing structure at the pivot 14, and to the strut cylinder by the link 21 and its terminal pivots 15 and 16. Accordingly, as the landing gear assembly is pivoted downwardly toward its operative position, the pivot mounting of the fairing door 12 causes its lower end to be separated from the adjacent door 11 thereby opening the intermediate joint 19, as well as the outer joint 18 at the undersurface of the wing. The clearance provided by the separation of the fairing units 11 and 12 at their intermediate joint 19 permits the telescoping shock absorbing action of the shock absorber strut 13, which is shown in the partially compacted or loaded condition in the dotted lines in Figure 2. It will be understood that the landing gear assembly 20 is provided with power-actuated mechanism for rotating the same about the pivot 13p between its retracted and extended positions and that suitable locks (with which the jackscrew 46 is preferably electrically interlocked), may be utilized for retaining the landing gear in its terminal positions. Tests have shown that the electric jackscrew 46 is much more satisfactory than the use of an electric solenoid which developed considerable heat during cycling tests of the landing gear and as a result its available pulling power was reduced to an unacceptable degree. A similarly operated landing gear and fairing door installation is also provided on the opposite side of the airplane.

Other forms and modifications of the present invention both with respect to its general arrangement and the details of its respective parts, are intended to come within the scope and spirit of the present invention as more particularly defined in the appended claims.

I claim:

1. In a retractable landing gear installation for an aircraft, a landing gear assembly, a retraction recess within the aircraft, means for retracting said landing gear assembly into said retraction recess, upper fairing means carried by said landing gear assembly for closing a portion of said retraction recess, lower fairing means pivotally mounted upon the aircraft and arranged for the automatic opening and closing of the remainder of said retraction recess upon extension and retraction of said landing gear, and resiliently biased breaking strut means for maintaining said lower fairing means open and closed in the operative and retracted positions of the landing gear.

2. In an aircraft including a retractable landing gear having a wheel-carrying strut, said strut pivotally mounted upon the aircraft arranged to move laterally inwardly to its retracted position, said aircraft having a recess within which said retractable landing gear is arranged to be retracted, a fairing assembly carried by said landing gear strut arranged to move therewith for closing a first portion of said retraction recess and a fairing door pivotally carried by the aircraft, the improvement of spring-biased breaking-strut means pivotally interconnecting said fairing door with said aircraft arranged for actuation by retraction of said landing gear for the closing of the remaining inboard portion of said retraction recess within the aircraft by said interconnected fairing door, detent means carried by said landing gear, and hook means carried by said breaking-strut means adjacent said pivotal connection to said aircraft engageable by said detent means carried by said landing gear for the initial opening of said fairing door at a greater rate of movement than said landing gear.

3. In an aircraft, a retractable landing gear installation including a landing gear assembly, said aircraft containing an opening through which said landing gear is arranged to be retracted, fairing means carried by said landing gear arranged to close a portion of said opening upon retraction of the landing gear, a fairing door pivotally carried upon the aircraft arranged for automatic movement into its open and closed positions initiated by extension and retraction movements of said landing gear, strut means for releasably holding said fairing door at each of its said positions and detent means carried by said strut means engageable by said landing gear for the initial opening of said fairing door at a greater rate of movement than said landing gear.

4. In a fairing installation for a retractable aircraft landing gear including an aircraft, a landing gear movably mounted upon the aircraft, said aircraft containing a recess within which said landing gear is arranged to be retracted, fairing means carried by said landing gear arranged for closing a portion of said recess in the retracted position of the landing gear and a fairing door pivotally mounted upon the aircraft, the improvement of a resiliently-biased breaking-strut pivotally interconnecting the aircraft with said fairing door, hook means carried by said breaking strut adjacent its pivotal connection to said aircraft, detent means carried by said landing gear arranged to engage said hook means and break said breaking-strut during the last phase only of the retraction of said landing gear for automatically moving said fairing door into the position on which it closes a remaining portion of said retraction recess, the said hook means carried by said breaking-strut engageable by said detent means during the initial phase of extension of said landing gear arranged for the opening of said fairing door at a greater rate of movement than said landing gear.

5. In a fairing installation for a retractable landing gear, a landing gear movably mounted upon the aircraft structure, said aircraft containing a recess within which said landing gear is arranged to be retracted, fairing means carried by the said landing gear for closing a portion of said recess in the retracted position of the landing gear, a fairing door pivotally mounted upon the aircraft, a breaking strut pivotally interconnecting the aircraft with said fairing door, the said landing gear arranged to break said breaking strut during the last phase of the retraction of said landing gear for automatically moving said fairing door into the position in which it closes the remaining portion of said recess, and resilient biasing means associated with said breaking strut arranged to maintain said door in both its opened and closed positions.

6. In a fairing installation for a retractable landing gear, a landing gear movably mounted upon the aircraft structure, said aircraft containing a recess within which said landing gear is arranged to be retracted, fairing means carried by the said landing gear for closing a portion of said recess in the retracted position of the landing gear, a fairing door pivotally mounted upon the aircraft, a breaking strut pivotally interconnecting the aircraft with said fairing door, the said landing gear arranged to break said breaking strut during the last phase of the retraction of said landing gear for automatically moving said fairing door into the position in which it closes the remaining portion of said recess, resilient biasing means associated with said breaking strut arranged to maintain said door in both its opened and closed positions, detent means carried by said breaking strut for releasable engagement by said movable landing gear for drawing said breaking strut into its aligned position during the initial phase of the extension of said landing gear for the opening of said fairing door.

7. In a fairing installation for a retractable landing gear, a landing gear movably mounted upon the aircraft structure, said aircraft containing a recess within which said landing gear is arranged to be retracted, fairing means carried by the said landing gear for closing a portion of said recess in the retracted position of the landing gear, a fairing door pivotally mounted upon the aircraft, a breaking strut pivotally interconnecting the aircraft with said fairing door, the said landing gear arranged to break said breaking strut during the last phase of the retraction of said landing gear for automatically moving said fairing door into the position in which it follows the retracting landing gear and closes the remaining portion of said recess, resilient biasing means associated with said breaking strut arranged to maintain said door in its opened and closed positions, detent means carried by said breaking strut for releasable engagement by said landing gear for drawing said breaking strut into its aligned position during the initial phase of extension of said landing gear for the opening of said fairing door, and locking means cooperatively carried by said fairing door and the aircraft structure for releasably retaining said fairing door in its closed position following the retraction of said landing gear.

8. In a fairing installation for a retractable landing gear, a landing gear movably mounted upon the aircraft structure, said aircraft containing a recess within which said landing gear is arranged to be retracted, fairing means carried by the said landing gear for closing a portion of said recess in the retracted position of the landing gear, a fairing door pivotally mounted upon the aircraft, a breaking strut pivotally interconnecting the aircraft with said fairing door, the said landing gear arranged to break said breaking strut during the last phase of the retraction of said landing gear for automatically moving said fairing door into the position in which it closes the remaining portion of said recess, resilient biasing means associated with said breaking strut arranged to maintain said door in its opened and closed positions, detent means carried by said breaking strut for releasable engagement by said landing gear for drawing said breaking strut into its aligned position during the initial phase of extension of said landing gear for the opening of said fairing door, a locking means cooperatively carried by said fairing door and the aircraft structure for releasably retaining said fairing door in its closed position, and electric power means initiated by operation of the landing gear for the release of said fairing door locking means prior to extension of the landing gear.

9. In a fairing installation for a retractable landing gear, a compartment within the aircraft into which a landing gear is arranged to be retracted, fairing means operatively attached to the landing gear for closing a portion of said compartment, a fairing door pivotally mounted upon the aircraft for the closing of the remainder of said retraction compartment, folding strut means for rigidly supporting said fairing door in its extended position, resilient biasing means operatively associated with said strut means arranged to urge said folding strut means beyond a dead-center position into either the extended or closed position of said fairing door and detent means carried by said folding strut means for engaging said landing gear assembly arranged in such manner that said folding strut means is moved to a position beyond its dead-center at which said resilient biasing means urges the folding strut means and its associated fairing door toward its extended and closed position as determined by the extension and retraction, respectively, of the landing gear.

10. In a fairing installation for a retractable landing gear, a compartment within the aircraft into which the landing gear is arranged to be retracted, fairing means operatively attached to the landing gear for closing a portion of said compartment, a fairing door pivotally mounted upon the aircraft for the closing of the remainder of said retraction compartment, strut means for rigidly supporting said fairing door in its extended position, resilient biasing means operatively associated with said strut means arranged to urge said strut means beyond a dead-center position into either the extended or closed position of said fairing door, detent means carried by said strut means for engaging said landing gear assembly arranged in such manner that said strut means will be moved to a position beyond its dead-center at which said resilient biasing means urges the strut means and its associated fairing door toward its extended or closed position as determined by the extension or retraction, respectively of the landing gear, and locking means cooperatively carried by said fairing door and said aircraft structure for supplementing said resilient biasing means and releasably retaining said fairing door in its closed position.

11. In an aircraft, a retractable landing gear movably mounted upon the aircraft for retraction into a recess therein, a fairing door pivotally mounted upon the aircraft arranged to close the said recess, mechanism for the actuation of said fairing door comprising a breaking strut assembly pivotally interconnecting the aircraft structure with said fairing door at its outer terminals and intermediately connected at a breaking pivot, resilient biasing means interconnecting the separate strut elements of said breaking strut assembly, abutting surfaces carried by the adjacent ends of said strut elements for limiting the relative movement thereof to an aligned position, a projecting portion carried by said landing gear, and recessed detent means carried by one of said strut elements engageable by said projecting portion of said movable landing gear for the unfolding of said breaking strut assembly assisted by said resilient means for opening said fairing door in advance of said retractable landing gear in the initial stage of its extending movement from said recess.

12. In aircraft, a fairing installation for a retractable landing gear movably associated with said aircraft for retraction into a recess therein, a fairing door pivotally mounted upon the aircraft arranged to close a portion of said landing gear recess, a pair of breaking strut door actuator elements pivotally interconnected at their adjacent terminals, said strut elements pivotally connected to the aircraft and said fairing door at their opposite outer terminals, resilient means interconnecting said strut elements arranged to urge said elements beyond a dead-center position into either the aligned or folded position, and actuating means cooperatively carried by one of said strut elements and said movable landing gear for carrying said strut element to either side of the said dead-center position dependent upon extension or retraction of said landing gear for the automatic opening and closing of said recess by the said fairing door.

13. In a retractable landing gear installation for an aircraft, a landing gear assembly, a recess within the aircraft means for retracting said landing gear assembly from an extended operative position into a retracted position within said recess, first fairing means carried by said landing gear assembly for closing a portion of said retraction recess, second fairing means pivotally mounted upon the aircraft and arranged for the automatic closing of the remainder of said retraction recess upon retraction of said landing gear assembly, and two-position resiliently-biased breaking-strut means arranged for maintaining said second fairing means closed in the retracted position of said landing gear assembly.

14. In a retractable landing gear installation for an aircraft, a landing gear operatively supported from the aircraft structure, a recess within the aircraft structure, means for retracting said landing gear into said recess, a first fairing means carried by said landing gear arranged for the closing of a portion of said recess upon retraction of the landing gear, second fairing means operatively supported from the aircraft structure and arranged for the automatic closing of the remainder of said retraction recess upon retraction of said landing gear, and two-position means including a resiliently-biased breaking-strut arranged to maintain said second fairing means in its closed relationship with respect to said retraction opening when said landing gear is in its retracted position.

15. In a retractable landing gear installation for an aircraft, a landing gear operatively supported from the aircraft, a recess within the aircraft, means for retracting said landing gear into said recess, a first fairing means carried by said landing gear arranged to close a portion of said recess upon retraction of the landing gear, a second fairing means operatively supported from the aircraft arranged for the automatic closing of the remainder of said retraction recess upon retraction of said landing gear, and two position means including a resiliently biased breaking strut pivotally interconnected between the aircraft and said second fairing means arranged to maintain said second fairing means closed in the retracted position of the landing gear in a first position of said means and to maintain said fairing door open in the extended position of the landing gear in the second position of said means.

EDWARD V. MISULIS.

REFERENCES CITED

The following references are of record in the file of this patent:

UNITED STATES PATENTS

| Number | Name | Date |
|---|---|---|
| 2,362,919 | Miller | Nov. 14, 1944 |
| 2,430,898 | Wallace | Nov. 18, 1947 |

FOREIGN PATENTS

| Number | Country | Date |
|---|---|---|
| 691,667 | Germany | June 3, 1940 |